(12) United States Patent
Homma

(10) Patent No.: US 10,533,774 B2
(45) Date of Patent: Jan. 14, 2020

(54) SOLAR HEAT COLLECTION TUBE AND SOLAR HEAT POWER GENERATION DEVICE

(71) Applicant: KABUSHIKI KAISHA TOYOTA JIDOSHOKKI, Kariya-shi, Aichi (JP)

(72) Inventor: Takayuki Homma, Aichi (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 92 days.

(21) Appl. No.: 15/740,467

(22) PCT Filed: May 26, 2016

(86) PCT No.: PCT/JP2016/065583
§ 371 (c)(1),
(2) Date: Dec. 28, 2017

(87) PCT Pub. No.: WO2017/002493
PCT Pub. Date: Jan. 5, 2017

(65) Prior Publication Data
US 2018/0195767 A1 Jul. 12, 2018

(30) Foreign Application Priority Data
Jun. 30, 2015 (JP) .................................. 2015-131154

(51) Int. Cl.
*F24S 10/70* (2018.01)
*F24S 70/10* (2018.01)
(Continued)

(52) U.S. Cl.
CPC ............... *F24S 10/70* (2018.05); *F24S 70/10* (2018.05); *F24S 70/30* (2018.05); *F24S 80/60* (2018.05)

(58) Field of Classification Search
CPC ................... F24J 2/24; F24J 2/48; F24S 10/70
(Continued)

(56) References Cited

U.S. PATENT DOCUMENTS 4,337,990 A * 7/1982 Fan ..................... G02B 5/282
359/360
4,582,764 A * 4/1986 Allerd ..................... F24S 70/25
428/623

(Continued)

FOREIGN PATENT DOCUMENTS

CN 101498517 B 12/2010
CN 102503168 A 6/2012
(Continued)

OTHER PUBLICATIONS

International Search Report for PCT/JP2016/065583 dated Aug. 16, 2016 [PCT/ISA/210].
(Continued)

*Primary Examiner* — Gregory L Huson
*Assistant Examiner* — Nikhil P Mashruwala
(74) *Attorney, Agent, or Firm* — Sughrue Mion, PLLC

(57) ABSTRACT

A solar heat collection tube with improved optical transmittance and durability to the external environment includes an inner tube through the interior of which a heat medium can flow, an outer tube that covers an outer periphery of the inner tube such that an annular heat insulating space is formed between the outer tube and the inner tube, and thermal expansion difference absorbing means or absorbing a thermal expansion difference between the inner tube and the outer tube. The outer tube is a glass tube, a first anti-reflection film is formed on an inner surface of the glass tube, a second anti-reflection film is formed on an outer surface of the glass tube, the second anti-reflection film is more durable to the external environment than the first
(Continued)

anti-reflection film, and the first anti-reflection film has a higher optical transmittance than the second anti-reflection film.

4 Claims, 2 Drawing Sheets

(51) Int. Cl.
  *F24S 70/30* (2018.01)
  *F24S 80/60* (2018.01)
(58) Field of Classification Search
  USPC .................................................. 126/634, 663
  See application file for complete search history.

(56) References Cited

U.S. PATENT DOCUMENTS

| | | | | |
|---|---|---|---|---|
| 6,076,932 | A * | 6/2000 | Uchida | G02B 5/22 359/614 |
| 8,215,766 | B2 * | 7/2012 | Nishimoto | C23C 14/083 351/41 |
| 2004/0126594 | A1 * | 7/2004 | Rubbia | F24S 70/30 428/446 |
| 2007/0000487 | A1 * | 1/2007 | Sakata | H01L 51/5088 126/561 |
| 2010/0226005 | A1 * | 9/2010 | Nishimoto | G02B 1/115 359/359 |
| 2010/0294263 | A1 * | 11/2010 | Kuckelkorn | G02B 1/11 126/676 |
| 2010/0313875 | A1 * | 12/2010 | Kennedy | F24S 10/45 126/652 |
| 2012/0011850 | A1 * | 1/2012 | Hebrink | G02B 5/0841 60/641.15 |
| 2012/0073628 | A1 * | 3/2012 | Yoshida | H01L 31/048 136/246 |
| 2012/0287659 | A1 * | 11/2012 | Katsura | C22C 5/06 362/516 |
| 2013/0040148 | A1 * | 2/2013 | Masuda | C09D 123/0892 428/421 |
| 2015/0036243 | A1 * | 2/2015 | Inoue | G11B 5/65 360/135 |
| 2015/0249164 | A1 * | 9/2015 | Karkkainen | H01L 31/1868 136/256 |
| 2015/0249166 | A1 * | 9/2015 | Iitsuka | G02B 1/10 136/256 |
| 2015/0316291 | A1 * | 11/2015 | Tsutsui | G02B 5/208 126/676 |

FOREIGN PATENT DOCUMENTS

| | | |
|---|---|---|
| CN | 202792647 U | 3/2013 |
| EP | 2 430 375 B1 | 7/2013 |
| EP | 2 676 940 A | 12/2013 |
| JP | 53-036152 U1 | 3/1978 |
| JP | 56-12748 A | 2/1981 |
| JP | 2012-526960 A | 11/2012 |
| JP | 2015-072076 A | 4/2015 |
| WO | 2013/141180 A1 | 9/2013 |
| WO | 2013189727 A1 | 12/2013 |
| WO | 2014131441 A1 | 9/2014 |

OTHER PUBLICATIONS

Communication dated Jun. 5, 2018, from the European Patent Office in counterpart European Application No. 16817602.2.
Communication dated Dec. 3, 2018, from the China National Intellectual Property Administration in counterpart Application No. 201680038469.1.

* cited by examiner

SOLAR HEAT COLLECTION TUBE AND SOLAR HEAT POWER GENERATION DEVICE

CROSS REFERENCE TO RELATED APPLICATIONS

This application is a National Stage of International Application No. PCT/JP2016/065583 filed May 26, 2016, claiming priority based on Japanese Patent Application No. 2015-131154 filed Jun. 30, 2015, the contents of all of which are incorporated herein by reference in their entirety.

TECHNICAL FIELD

The present invention relates to a solar heat collection tube and a solar heat power generation device.

BACKGROUND ART

A conventional solar heat power generation device generates power using solar heat. This solar heat power generation device typically generates power by collecting sunlight using collecting means, heating a heat medium in a solar heat collection tube using the collected sunlight, and using the thermal energy of the heated heat medium in a generator. The solar heat collection tube has a duplex tube structure formed from a metal inner tube through which the heat medium can flow, and a glass outer tube. Further, in order to suppress heat loss caused by heat radiation, a vacuum is typically maintained between the inner tube and the outer tube, and in order to absorb a thermal expansion coefficient difference between the inner tube and the outer tube, the two tubes are typically connected via thermal expansion difference absorbing means such as a bellows.

The glass tube (a glass tube used for a solar heat collection tube) serving as the outer tube of the solar heat collection tube having this structure requires a high degree of optical transparency in order to transmit the sunlight efficiently. Typically, when sunlight enters the glass tube, approximately 4% of the sunlight (100%) reaching the glass tube is reflected by each of an outer surface and an inner surface of the glass tube, and therefore approximately 92% of the sunlight passes through the glass tube of the solar heat collection tube. Hence, a method of forming an anti-reflection film on at least one of the outer surface and the inner surface of the glass tube used for the solar heat collection tube in order to reduce sunlight reflection by the glass tube used for the solar heat collection tube has been proposed (Patent Document 1, for example).

Patent Document 1: Japanese Patent Application Laid-Open No. 2004-239603

SUMMARY OF THE INVENTION

Problems to be Solved by the Invention

A solar heat collection tube is normally disposed outside in a desert area or the like, where the daily amount of solar radiation is large, so that sufficient sunlight reaches the solar heat collection tube, and therefore the environment where the solar heat collection tube is used is extremely harsh. The outer surface of the glass tube used for the solar heat collection tube, which contacts the external environment, is particularly exposed to wind and rain, dust and so on, and in addition, when dirt adheres thereto, the dirt must be removed by washing to prevent a reduction in the optical transparency of the glass tube used for the solar heat collection tube. Hence, a solar heat collection tube requires not only a high degree of optical transparency, but also a high degree of durability (abrasion resistance, wear resistance, and so on, for example) to external environmental factors such as wind and rain, dust, and washing. In particular, when an anti-reflection film is formed on the outer surface of a glass tube used for a solar heat collection tube in order to improve the optical transparency of the glass tube, it is necessary to prevent the anti-reflection film from being easily damaged or peeled away by the external environment.

The present invention has been designed to solve the problems described above, and an object thereof is to provide a solar heat collection tube with which improvements in both optical transmittance and durability to the external environment are achieved.

A further object of the present invention is to provide a solar heat power generation device that is highly durable to the external environment and can convert sunlight into heat efficiently.

Means for Solving the Problems

The present invention is a solar heat collection tube having:

an inner tube through the interior of which a heat medium can flow;

an outer tube that covers an outer periphery of the inner tube such that an annular heat insulating space is formed between the outer tube and the inner tube; and thermal expansion difference absorbing means for absorbing a thermal expansion difference between the inner tube and the outer tube, wherein the outer tube is a glass tube, a first anti-reflection film is formed on an inner surface of the glass tube, a second anti-reflection film is formed on an outer surface of the glass tube, and the second anti-reflection film is more durable to an external environment than the first anti-reflection film, and the first anti-reflection film has a higher optical transmittance than the second anti-reflection film.

Further, the present invention is a solar heat power generation device having the solar heat collection tube described above.

Advantageous Effects of the Invention

According to the present invention, it is possible to provide a solar heat collection tube with which improvements in both optical transmittance and durability to the external environment are achieved.

Further, according to the present invention, it is possible to provide a solar heat power generation device that is highly durable to the external environment and can convert sunlight into heat efficiently.

DESCRIPTION OF EMBODIMENTS

A preferred embodiment of a solar heat collection tube and a solar heat power generation device according to the present invention will be described below.

Figure 1:
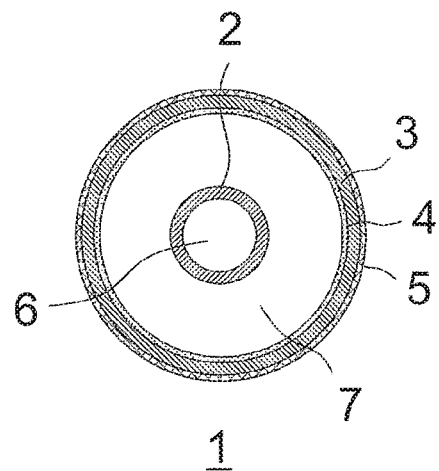
FIG. 1 is a sectional view taken perpendicular to a lengthwise direction of a solar heat collection tube according to the present invention.
Figure 2:
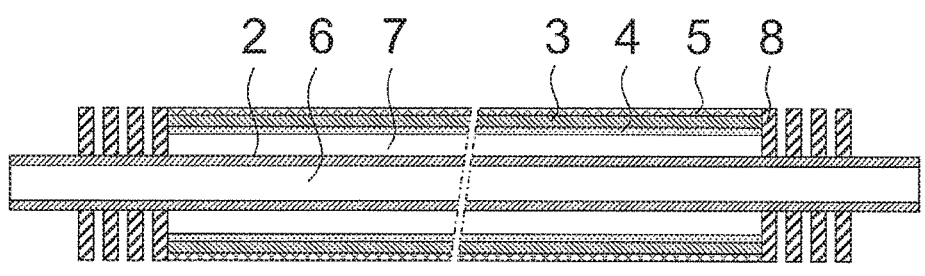
FIG. 2 is a sectional view taken parallel to the lengthwise direction of the solar heat collection tube according to the present invention.

FIG. 1 is a sectional view taken perpendicular to a lengthwise direction of a solar heat collection tube according to the present invention, and FIG. 2 is a sectional view taken parallel to the lengthwise direction of the solar heat collection tube according to the present invention.

As shown in FIGS. 1 and 2, a solar heat collection tube 1 according to the present invention has a duplex tube structure including an inner tube 2 and an outer tube 3. A mesoporous silica film 4 is formed on an inner surface of the outer tube 3 as a first anti-reflection film, and a hollow silica film 5 is formed on an outer surface of the outer tube 3 as a second anti-reflection film. A heat medium 6 can flow through the interior of the inner tube 2. A heat insulating region 7 is formed between the inner tube 2 and the outer tube 3 to suppress heat loss caused by heat radiation. The heat insulating region 7 is formed by, for example, creating a vacuum in an annular space formed between the inner tube 2 and the outer tube 3, or filling the annular space with an inert gas. Further, the inner tube 2 and the outer tube 3 are connected via thermal expansion difference absorbing means 8 for absorbing a thermal expansion coefficient difference between the two tubes.

In the solar heat collection tube 1 according to the present invention, having the structure described above, the outer tube 3, on which the mesoporous silica film 4 and the hollow silica film 5 are formed, corresponds to a glass tube used for a solar heat collection tube.

The glass tube used for the solar heat collection tube is exposed to wind and rain, dust and so on, and in addition, when dirt adheres thereto, the dirt must be removed by washing to prevent a reduction in the optical transparency of the glass tube used for the solar heat collection tube. Hence, the glass tube used for the solar heat collection tube requires not only a high degree of optical transparency, but also a high degree of durability (abrasion resistance, wear resistance, and so on, for example) to external environmental factors such as wind and rain, dust, and washing. In this specification, "abrasion resistance" means that the glass tube is unlikely to be damaged even when scratched. Further, "wear resistance" means that the glass tube is unlikely to become worn even when subjected to mechanical actions such as friction.

Figure 3:
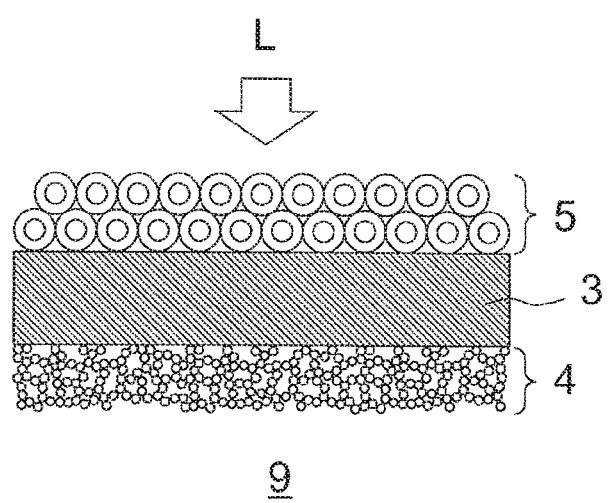
FIG. 3 is a partially enlarged sectional view of a glass tube used for a solar heat collection tube, which is used in the solar heat collection tube according to the present invention.

FIG. 3 is a partially enlarged sectional view of the glass tube used for the solar heat collection tube, which is used in the solar heat collection tube according to the present invention.

As shown in FIG. 3, in the glass tube 9 used for the solar heat collection tube, the mesoporous silica film 4 is formed on the inner surface of the outer tube 3 as the first anti-reflection film, and the hollow silica film 5 is formed on the outer surface of the outer tube 3 as the second anti-reflection film. Note that L denotes sunlight.

The mesoporous silica film 4 is a silica film having mesopores. Here, mesopores are fine pores having a diameter between 2 nm and 50 nm. The mesoporous silica film 4 exhibits a high degree of optical transparency, but since the fine pore walls are amorphous, the mechanical strength thereof is low, and therefore the durability thereof to the external environment is lower than that of the hollow silica film. Hence, in the glass tube 9 used for the solar heat collection tube, the mesoporous silica film 4 is formed on the inner surface of the outer tube 3, which does not need to be durable to the external environment.

The hollow silica film 5 is a film having hollow silica particles as a main body. Here, hollow silica particles are silica particles having a space in the interior thereof. The hollow silica film 5 is slightly less optically transparent than the mesoporous silica film 4, but since the hollow silica particles are bonded regularly, the mechanical strength thereof is high, and therefore the durability thereof to the external environment is higher than that of the mesoporous silica film. Hence, in the glass tube 9 used for the solar heat collection tube, the hollow silica film 5 is formed on the outer surface of the outer tube 3, which needs to be durable to the external environment.

The mesoporous silica film 4 may be formed in a typical manner by means of a sol-gel reaction, although there are no particular limitations thereon. In a sol-gel reaction, a sol reaction solution is applied to the inner surface of the outer tube 3, dried, and then fired, whereby the mesoporous silica film 4 is formed.

A sol reaction solution with which the mesoporous silica film 4 can be formed is commercially available, and therefore the mesoporous silica film 4 can be formed using a commercially available sol reaction solution.

Typical sol reaction solutions include a silica precursor material, an organic solvent, a catalyst, water, and so on.

There are no particular limitations on the silica precursor material, but examples thereof include alkoxysilanes such as tetramethoxysilane, tetraethoxysilane, and tetrapropoxysilane, and so on. These materials may be used singly or in mixtures of two or more materials.

There are no particular limitations on the solvent, but examples thereof include alcohols such as methanol, ethanol, 2-propanol, and 1-propanol. These solvents may be used singly or in mixtures of two or more solvents.

There are no particular limitations on the catalyst, but examples thereof include an acid such as hydrochloric acid, acetic acid, or nitric acid, or a base such as sodium hydroxide or ammonia. These catalysts may be used singly or in mixtures of two or more catalysts.

There are no particular limitations on the method of applying the sol reaction solution, but a dip coating method or the like may be used.

There are no particular limitations on the method of firing the applied film, but an electric furnace or the like may be used. There are no particular limitations on the temperature at which the applied film is fired, but the temperature is typically set at no higher than 600° C., and preferably between 350° C. and 500° C.

The porosity of the mesoporous silica film 4 is preferably between 30% and 50%. By controlling this porosity, the optical transmittance of the mesoporous silica film 4 can be improved. In this specification, the "porosity" denotes a value calculated by measuring the refractive index and inserting the measured value of the refractive index into the Lorentz-Lorentz formula.

The thickness of the mesoporous silica film 4 is preferably between 80 nm and 200 nm, although there are no particular limitations thereon. By controlling this thickness, the optical transmittance of the mesoporous silica film 4 can be improved. In this specification, the "thickness" denotes a value measured using a commercially available film thickness gauge.

The hollow silica film 5 can be formed using a method that is well known in the corresponding technical field. Similarly to the mesoporous silica film 4, the hollow silica film 5 may be formed by a sol-gel reaction, for example. In the sol-gel reaction, a sol reaction solution containing a hollow silica sol, a silicon compound, a metal chelate compound, and so on may be applied to the outer surface of the outer tube 3, dried, and then fired, whereby the hollow silica film 5 is formed.

Alternatively, a dispersed solution in which hollow silica particles are dispersed through an organic solvent may be applied to the outer surface of the outer tube 3, dried, and then fired, whereby the hollow silica film 5 is formed. The sol reaction solution and the dispersed solution used to form the hollow silica film 5 are commercially available, and therefore the hollow silica film 5 can be formed using a commercially available sol reaction solution.

A known material disclosed in Japanese Patent Application Publication No. 2001-233611, for example, may be employed as the hollow silica sol used in the sol reaction solution.

Examples of the silicon compound used in the sol reaction solution include silane coupling agents such as tetramethoxysilane, tetraethoxysilane, and tetrapropoxysilane. These compounds may be used singly, or in mixtures of two or more compounds.

Examples of the metal chelate compound used in the sol reaction solution include titanium, zirconium, aluminum, tin, niobium, tantalum, and lead compounds containing a bidentate ligand such as acetylacetonate. These compounds may be used singly, or in mixtures of two or more compounds.

Examples of the organic solvent used in the sol reaction solution include alcohols such as methanol, ethanol, 2-propanol, and 1-propanol. These solvents may be used singly or in mixtures of two or more solvents.

There are no particular limitations on the methods of applying and firing the sol reaction solution or the dispersed solution, but similar conditions to those applied when forming the mesoporous silica film 4 may be employed.

An average particle diameter of the hollow silica particles forming the hollow silica film 5 is preferably between 10 nm and 100 nm, although there are no particular limitations thereon. By controlling this average particle diameter, the optical transmittance of the hollow silica film 5 can be improved. In this specification, the "average particle diameter" denotes a value measured by observation using a dynamic light scattering method or a cross-sectional TEM method.

The porosity of the hollow silica film 5 is preferably between 15% and 30%, although there are no particular limitations thereon. By controlling this porosity, the optical transmittance of the outer tube 3 can be improved.

The thickness of the hollow silica film 5 is preferably between 80 nm and 200 nm, although there are no particular limitations thereon. By controlling this thickness, the optical transmittance of the outer tube 3 can be improved.

The outer tube 3 on which the mesoporous silica film 4 and the hollow silica film 5 are formed is a glass tube. There are no particular limitations on the material of the glass tube, and typical transparent, heat-resistant glass may be used. A borosilicate glass tube or the like, for example, may be used as a transparent, heat-resistant glass.

In the glass tube 9 used for the solar heat collection tube configured as described above, the hollow silica film 5, which exhibits a high degree of durability to the external environment, is formed on the outer surface of the outer tube 3, while the mesoporous silica film 4, which exhibits a high degree of optical transparency, is formed on the inner surface of the outer tube 3, and therefore, with the solar heat collection tube 1, improvements in both optical transmittance and durability to the external environment can be achieved.

Note that in the above description, an example in which the mesoporous silica film 4 is used as the first anti-reflection film and the hollow silica film 5 is used as the second anti-reflection film was described, but as long as the condition that the second anti-reflection film is more durable to the external environment than the first anti-reflection film and the first anti-reflection film has a higher optical transmittance than the second anti-reflection film is satisfied, there are no particular limitations on the materials of the first anti-reflection film and the second anti-reflection film. More specifically, various low refractive index films, such as $SiO_2$ film, SiN film, or $TiO_2$ film, may be used as the first anti-reflection film and the second anti-reflection film.

In the solar heat collection tube 1 according to the present invention, there are no particular limitations on the inner tube 2 through the interior of which the heat medium 6 can flow, and a member that is well known in the corresponding technical field may be used. Typically, a heat-resistant metal such as an iron-based material (for example, stainless steel, heat-resistant steel, alloyed steel, or carbon steel) or an aluminum-based material may be used as the material of the inner tube 2. Among these materials, stainless steel or heat-resistant steel is preferably used for the inner tube 2 in consideration of the use environment (for example, a heating temperature of the inner tube 2).

Further, an optically selective film may be formed on an outer surface of the inner tube 2 to improve the heat collection efficiency thereof. Here, an optically selective film is a film that absorbs visible rays and near-infrared rays of the sunlight L while reflecting far-infrared rays radiated from the heat medium. By providing an optically selective film, the sunlight L can be absorbed efficiently, and heat radiation from the heat medium 6 can be suppressed. There are no particular limitations on the optically selective film, and a film that is well known in the corresponding technical field may be used. Examples of optically selective films include black chrome-plated film, black nickel-plated film, electroless nickel black oxide film, tri-iron tetroxide film, and so on.

There are no particular limitations on the heat medium 6 that flows through the interior of the inner tube 2, and a heat medium that is well known in the corresponding technical field may be used. Examples of the heat medium 6 include water, oil, molten salt (molten sodium, for example), and so on.

The thermal expansion difference absorbing means 8 is provided to absorb the thermal expansion coefficient difference between the inner tube 2 and the outer tube 3. There are no particular limitations on the thermal expansion difference absorbing means 8, and means that is well known in the corresponding technical field may be used. Examples of the thermal expansion difference absorbing means 8 include a bellows, a diaphragm, and so on. There are no particular limitations on the material of the thermal expansion difference absorbing means 8, and a heat-resistant metal such as an iron-based material (for example, stainless steel, heat-resistant steel, alloyed steel, or carbon steel) or an aluminum-based material, for example, may be used.

There are no particular limitations on a method of connecting the thermal expansion difference absorbing means 8 to the inner tube 2 and the outer tube 3, and a well-known bonding method such as welding, soldering, or brazing, for example, may be used.

The heat insulating region 7 is formed between the inner tube 2 and the outer tube 3, and therefore heat loss due to heat radiation can be suppressed.

With the solar heat collection tube 1 according to the present invention, configured as described above, improvements in both optical transmittance and durability to the external environment can be achieved.

The solar heat collection tube 1 according to the present invention is used in combination with collecting means. There are no particular limitations on the collecting means, as long as the collecting means is capable of collecting the sunlight L in the solar heat collection tube 1, and means that are well known in the corresponding technical field may be used. A curved mirror typically used in a so-called trough type solar heat collection device may be cited as an example of collecting means. The collecting means is typically formed to have a paraboloid-shaped cross-section in a lengthwise direction thereof. Further, an inner surface of the collecting means (the surface on the side of the solar heat collection tube 1) is a mirror surface, and the solar heat collection tube 1 is supported in the lengthwise direction in a focal position thereof. Note that the collecting means is not limited to a trough type collecting means, and a Fresnel type collecting means, a linear Fresnel type collecting means, and so on may be used instead.

The solar heat collection tube 1 according to the present invention is used in a solar heat power generation device. In the solar heat power generation device, the sunlight L is collected in the solar heat collection tube 1 by the collecting means, the heat medium 6 in the inner tube 2 of the solar heat collection tube 1 is heated by the collected sunlight L, and the thermal energy of the heated heat medium 6 is used by the generator to generate power. The solar heat power generation device includes the solar heat collection tube 1 with which improvements in both optical transmittance and durability to the external environment are achieved, and therefore the sunlight L can be converted into heat efficiently, leading to an improvement in generation efficiency.

There are no particular limitations on the generator used in the solar heat power generation device as long as the generator is capable of converting heat into electricity. A generator that generates power by evaporating an evaporation medium such as water or ammonia using the heated heat medium 6 and rotating a steam turbine using the resulting steam may be cited as an example of the generator.

EXAMPLES

The present invention will be described in detail below using an example and comparative examples, although the present invention is not limited thereto.

Example 1

Using borosilicate glass in the shape of a 14 cm² flat plate (thickness 1 mm) as a substrate, the substrate was cleaned ultrasonically using an alkaline detergent, rinsed using deionized water, and dried. Next, a commercially available dispersed solution formed by dispersing hollow silica particles having an average particle diameter of 50 nm through an alcohol solvent was applied to a front surface of the substrate using a dip coater, and then dried at room temperature. Further, a commercially available sol reaction solution containing alkoxysilane as a silica precursor material was applied to a rear surface of the substrate using a dip coater, and then dried at room temperature. Next, the substrate with the applied films formed thereon was heated for one hour at 400° C., whereby a substrate formed with the hollow silica film 5 on the front surface and the mesoporous silica film 4 on the rear surface was obtained. Here, respective thicknesses of the hollow silica film 5 formed on the front surface of the substrate and the mesoporous silica film 4 formed on the rear surface of the substrate were 111 nm and 119 nm. Further, the respective porosities of the hollow silica film 5 and the mesoporous silica film 4 formed on the substrate were determined by measuring the respective refractive indices thereof using a spectroscopic ellipsometer manufactured by Semilab Inc., and inserting the measured values of the refractive indices into the Lorentz-Lorentz formula. As a result, the porosity of the hollow silica film 5 was 21%, and the refractive index of the mesoporous silica film 4 was 40%. Note that the porosity was measured using a similar method in the comparative examples described below.

Comparative Example 1

A substrate having the hollow silica film 5 on both the front surface and the rear surface thereof was manufactured in a manner similar to Example 1, except that the commercially available dispersed solution formed by dispersing hollow silica particles having an average particle diameter of 50 nm through an alcohol solvent was applied to both the front surface and the rear surface of the substrate using a dip coater, and then dried at room temperature. Here, the thickness of the hollow silica films formed on the front surface and the rear surface of the substrate was 117 nm. Further, the porosity of the hollow silica films 5 formed on the substrate was 21%.

Comparative Example 2

A substrate having the mesoporous silica film 4 on both the front surface and the rear surface thereof was manufactured in a manner similar to Example 1, except that the commercially available sol reaction solution containing alkoxysilane as a silica precursor material was applied to both the front surface and the rear surface of the substrate using a dip coater, and then dried at room temperature. Here, the thickness of the mesoporous silica films 4 formed on the front surface and the rear surface of the substrate was 121 nm. Further, the porosity of the mesoporous silica films 4 formed on the substrate was 40%.

The optical transmittance and durability to the external environment were then evaluated in relation to the substrates obtained in the example and comparative examples described above. Note that the following evaluations were made on the assumption that the front surface of the substrate serves as the outer surface of the glass tube (the outer tube 3) and the rear surface of the substrate serves as the inner surface of the glass tube (the outer tube 3).

The optical transmittance was evaluated by measuring the optical transmittance at a wavelength of 600 nm using a spectrophotometer U-4100 manufactured by Hitachi High-Technologies Corporation. An average value of values measured in three arbitrary points was used as the measurement result of the optical transmittance. Note that the optical transmittance of the substrate was 91.6%.

The durability to the external environment was evaluated by rubbing the hollow silica film 5 or the mesoporous silica film 4 formed on the front surface of the substrate ten times in each direction at a friction load of 200 g/cm² and a movement speed of 40 mm/second using #0000 steel wool, and then visually determining whether or not the hollow silica film 5 or mesoporous silica film 4 had peeled away. This evaluation was performed while increasing the friction load in increments of 200 g/cm² in order to determine the friction load at which the hollow silica film 5 or the mesoporous silica film 4 completely peeled away.

The results are shown on Table 1.

TABLE 1

|  | Optical transmittance (%) | Wear resistance (kg/cm²) |
|---|---|---|
| Example 1 | 98.7 | 1.4 |
| Comparative Example 1 | 97.8 | 1.4 |
| Comparative Example 2 | 99.7 | 0.4 |

As is evident from the results on Table 1, with the substrate according to Example 1, in which the hollow silica film 5 was formed on the front surface and the mesoporous silica film 4 was formed on the rear surface, the optical transmittance and the durability to the external environment were both high. With the substrate according to Comparative Example 1, on the other hand, in which the hollow silica film 5 was formed on both the front surface and the rear surface, the durability to the external environment was high, but the optical transmittance was low. Further, with the substrate according to Comparative Example 2, in which the mesoporous silica film 4 was formed on both the front surface and the rear surface, the optical transmittance was high, but the durability to the external environment was low.

According to the present invention, as is evident from the above results, in the solar heat collection tube 1 having the inner tube 2 through the interior of which the heat medium can flow, the outer tube 3 that covers the outer periphery of the inner tube 2 such that an annular heat insulating space is formed between the outer tube 3 and the inner tube 2, and the thermal expansion difference absorbing means 8 for absorbing the thermal expansion difference between the inner tube 2 and the outer tube 3, the outer tube 3 is formed from a glass tube, the first anti-reflection film is formed on the inner surface of the glass tube, the second anti-reflection film is formed on the outer surface of the glass tube, the second anti-reflection film is formed to be more durable to the external environment than the first anti-reflection film, and the first anti-reflection film is formed to have a higher optical transmittance than the second anti-reflection film, and therefore, with the solar heat collection tube 1, improvements in both optical transmittance and durability to the external environment can be achieved.

In the solar heat collection tube 1, the first anti-reflection film is preferably the mesoporous silica film 4 having a porosity of 30% to 50%, and the second anti-reflection film is preferably the hollow silica film 5 having a porosity of 15% to 30%. Further, the respective thicknesses of the first anti-reflection film and the second anti-reflection film are preferably between 80 nm and 200 nm. Furthermore, the inner tube 2 is preferably a metal tube, and an optically selective film that absorbs visible rays and near-infrared rays from sunlight while reflecting far-infrared rays radiated from the heat medium is preferably formed on the front surface of the metal tube.

Moreover, according to the present invention, by including the solar heat collection tube 1 described above, it is possible to provide a solar heat power generation device that is highly durable to the external environment and can convert sunlight into heat efficiently.

EXPLANATION ON NUMERALS

1 Solar heat collection tube
2 Inner tube
3 Outer tube
4 Mesoporous silica film
5 Hollow silica film
6 Heat medium
7 Heat insulating region
8 Thermal expansion difference absorbing means
9 Glass tube used for solar heat collection tube
L Sunlight

The invention claimed is:
1. A solar heat collection tube comprising:
an inner tube through the interior of which a heat medium can flow;
an outer tube that covers an outer periphery of the inner tube such that an annular heat insulating space is formed between the outer tube and the inner tube; and
thermal expansion difference absorbing means for absorbing a thermal expansion difference between the inner tube and the outer tube,
wherein the outer tube is a glass tube,
a first anti-reflection film is formed on an inner surface of the glass tube,
a second anti-reflection film is formed on an outer surface of the glass tube, and
the first anti-reflection film is a mesoporous silica film having a porosity of 30% to 50%, and
the second anti-reflection film is a hollow silica film having a porosity of 15% to 30%.
2. The solar heat collection tube according to claim 1, wherein respective thicknesses of the first anti-reflection film and the second anti-reflection film are between 80 nm and 200 nm.
3. The solar heat collection tube according to claim 1, wherein the inner tube is a metal tube, and
an optically selective film that absorbs visible rays and near-infrared rays from sunlight while reflecting far-infrared rays radiated from the heat medium is formed on a front surface of the metal tube.
4. A solar heat power generation device comprising the solar heat collection tube according to claim 1.

* * * * *